(12) United States Patent
Armenoff

(10) Patent No.: US 11,995,764 B2
(45) Date of Patent: May 28, 2024

(54) METHOD, APPARATUS AND COMPUTER PROGRAM PRODUCT FOR TUNNEL DETECTION FROM A POINT CLOUD

(71) Applicant: HERE GLOBAL B.V., Eindhoven (NL)

(72) Inventor: Nicholas Armenoff, Montgomery, IL (US)

(73) Assignee: HERE GLOBAL B.V., Eindhoven (NL)

( * ) Notice: Subject to any disclaimer, the term of this patent is extended or adjusted under 35 U.S.C. 154(b) by 393 days.

(21) Appl. No.: 17/305,121

(22) Filed: Jun. 30, 2021

(65) Prior Publication Data

US 2023/0003545 A1 Jan. 5, 2023

(51) Int. Cl.
| | |
|---|---|
| *G06T 17/00* | (2006.01) |
| *G01C 21/00* | (2006.01) |
| *G06F 18/2415* | (2023.01) |
| *G06T 15/00* | (2011.01) |
| *G06V 20/56* | (2022.01) |

(52) U.S. Cl.
CPC .......... *G06T 17/00* (2013.01); *G06F 18/2415* (2023.01); *G06T 15/005* (2013.01); *G01C 21/3822* (2020.08); *G06V 20/588* (2022.01)

(58) Field of Classification Search
CPC ....... G06T 15/005; G06T 17/00; G06V 10/82; G06V 20/56; G06V 20/588
See application file for complete search history.

(56) References Cited

U.S. PATENT DOCUMENTS

2017/0023678 A1    1/2017  Pink et al.
2018/0373980 A1*  12/2018  Huval .................. G06F 18/41
(Continued)

FOREIGN PATENT DOCUMENTS

| CN | 105203551 A | 12/2015 |
|---|---|---|
| CN | 104567708 B | 3/2018 |

OTHER PUBLICATIONS

Chen et al., "Automatic Detection of Tunnel Lining Using Image Processing Supported by Terrestrial Laser Scanning Technology", 2017 IEEE 2nd Information Technology, Networking, Electronic and Automation Control Conference (ITNEC), (Dec. 15-17, 2017), 5 pages.

(Continued)

*Primary Examiner* — Ming Wu

(57) ABSTRACT

Provided herein is a method, apparatus, and computer program product for identifying locations along a road segment as a tunnel based on point cloud data. Methods may include: receiving point cloud data representative of an environment of a trajectory along a road segment; generating, from the point cloud data, one or more two-dimensional images in one or more corresponding planes orthogonal to the trajectory; determining, for the one or more two-dimensional images, a probability as to whether a respective two-dimensional image is captured within a tunnel along the road segment; and classifying a point along the road segment at a position corresponding to a respective one of the one or more two-dimensional images as a tunnel point in response to the probability as to whether the respective two-dimensional image is captured within a tunnel along the road segment satisfying a predetermined value.

20 Claims, 4 Drawing Sheets

(56) References Cited

U.S. PATENT DOCUMENTS

| | | | |
|---|---|---|---|
| 2019/0187718 A1* | 6/2019 | Zou | G05D 1/0231 |
| 2019/0325595 A1* | 10/2019 | Stein | G06V 10/764 |
| 2019/0384303 A1* | 12/2019 | Muller | G06N 20/00 |
| 2020/0182969 A1 | 6/2020 | He et al. | |

OTHER PUBLICATIONS

Wang et al., "Application and Validation of Profile-Image Method for Measuring Deformation of Tunnel Wall", Tunnelling and Underground Space Technology, (2008), 12 pages.

Zhang et al., "Automatic Tunnel Steel Arches Extraction Algorithm Based on 3D LiDAR Point Cloud", Sensors 2019, 19(18), 3972, (Sep. 14, 2019), 24 pages.

* cited by examiner

METHOD, APPARATUS AND COMPUTER PROGRAM PRODUCT FOR TUNNEL DETECTION FROM A POINT CLOUD

An example embodiment of the present invention relates generally to mapping and modeling a three dimensional environment, and more particularly, to using LiDAR data or equivalents thereof to accurately model an environment and to identify tunnels within point clouds.

BACKGROUND

Map generation for two-dimensional and three-dimensional maps is a time consuming and data-intensive process, particularly when generating three-dimensional maps that are highly accurate. Identifying accurate locations within three-dimensional maps can be of critical importance when those maps are employed for route guidance and to facilitate autonomous and semi-autonomous vehicle control. For a three-dimensional map to be of a quality sufficient to facilitate autonomous and semi-autonomous vehicle control, the maps must include substantial detail and accurate location of boundaries and objects within the mapped region and for the road geometry.

Road geometry modelling is very useful for three-dimensional map creation and 3D terrain identification along with feature and obstacle detection in environments, each of which may facilitate autonomous vehicle navigation along a prescribed path. Traditional methods for 3D modelling of road geometry and object or feature detection and correlation of features between images from different perspectives are resource intensive, often requiring significant amounts of human measurement and calculation. Such methods are thus time consuming and costly. Exacerbating this issue is the fact that many modern-day applications (e.g., 3D mapping, terrain identification, or the like) require manual or semi-automated analysis and labelling of large amounts of data, and therefore are not practical without quicker or less costly techniques.

Some current methods rely upon feature detection from image data to perform road terrain detection or environment feature detection, but these methods have deficiencies. For instance, some systems designed for terrain and feature detection around a vehicle exist but may be unreliable. Further, the reliability of feature detection may not be known such that erroneous feature detection or lack of feature detection may adversely impact autonomous or semi-autonomous driving. Over-estimating the accuracy of feature detection may cause safety concerns as object locations may be improperly interpreted as accurate when they are actually inaccurate, while under-estimating accuracy may lead to inefficiencies through overly cautious behaviors. Further, map data reconstruction of an environment may be inaccurate if object identification does not properly establish the location of an object in three-dimensional space due to inaccuracy during the detection stage. Locating of objects in three-dimensional space from two-dimensional images is challenging and is generally resource intensive.

BRIEF SUMMARY

A method, apparatus, and computer program product are therefore provided to map and model a three dimensional environment, and more particularly, to use LiDAR data or point cloud generating equivalents thereof to accurately model an environment and to identify tunnels within point clouds. Further, the ubiquity and relatively low-cost of sensors to gather data such as point cloud data may provide access to tremendous amounts of data that can be used in various ways to enhance location-based services, such as through the generation and analysis of three-dimensional models of an environment including the identification of features, such as tunnels as described herein. Embodiments may provide an apparatus including at least one processor and at least one non-transitory memory including computer program code instructions, the computer program code instructions configured to, when executed, cause the apparatus to at least: receive point cloud data representative of an environment from at least one sensor-equipped vehicle traveling on a trajectory along a road segment; generate, from the point cloud data, one or more two-dimensional images in one or more corresponding planes orthogonal to the trajectory; determine, for the one or more two-dimensional images, a probability as to whether a respective two-dimensional image is captured within a tunnel along the road segment; classify a point along the road segment at a position corresponding to a respective one of the one or more two-dimensional images as a tunnel point in response to the probability as to whether the respective two-dimensional image is captured within a tunnel along the road segment satisfying a predetermined value; and update a map database of a road network including the road segment with the point along the road segment classified as a tunnel point.

According to some embodiments, causing the apparatus to determine for the one or more two-dimensional images, a probability as to whether the respective two-dimensional image is captured within a tunnel along the road segment includes causing the apparatus to: process the respective two-dimensional image as an input to a convolutional neural network; and generate, from the convolutional neural network, the probability as to whether the respective two-dimensional image is captured within a tunnel along the road segment. The apparatus of some embodiments is caused to classify a point along the road segment at a position corresponding to a respective one of the one or more two-dimensional images as a non-tunnel point in response to the probability as to whether the respective two-dimensional image is captured within a tunnel along the road segment failing to satisfy the predetermined value.

According to some embodiments, the apparatus is further caused to identify a first tunnel point following a non-tunnel point in a direction of travel of the trajectory as a tunnel entrance point, where the tunnel entrance point represents the entrance of a tunnel along the road segment. According to some embodiments, the apparatus is further caused to identify a first non-tunnel point following a tunnel point in the direction of travel of the trajectory as a tunnel exit point, where the tunnel exit point represents an exit of the tunnel along the road segment. The apparatus of some embodiments is caused to update the map database of the road network to include the tunnel entrance point and the tunnel exit point. Causing the apparatus of some embodiments to update a map database of the road network including the road segment with the point along the road segment classified as a tunnel point includes causing the apparatus to update the map database of the road network with bounds of a tunnel entrance and exit.

Embodiments provided herein include a computer program product having at least one non-transitory computer-readable storage medium having computer-executable program code instructions stored therein, the computer-executable program code instructions including program code instructions to: receive point cloud data representative of an environment from at least one sensor-equipped vehicle traveling on a trajectory along a road segment; generate, from the point cloud data, one or more two-dimensional images in one or more corresponding planes orthogonal to the trajectory; determine, for the one or more two-dimensional images, a probability as to whether a respective two-dimensional image is captured within a tunnel along the road segment; classify a point along the road segment at a position corresponding to a respective one of the one or more two-dimensional images as a tunnel point in response to the probability as to whether the respective two-dimensional image is captured within a tunnel along the road segment satisfying a predetermined value; and update a map database of a road network including the road segment with the point along the road segment classified as a tunnel point.

According to some embodiments, the program code instructions to determine, for the one or more two-dimensional images, a probability as to whether the respective two-dimensional image is captured within a tunnel along the road segment includes program code instructions to: process the respective two-dimensional image as an input to a convolutional neural network; and generate, from the convolutional neural network, the probability as to whether the respective two-dimensional image is captured within a tunnel along the road segment. Embodiments may include program code instructions to: classify a point along the road segment at a position corresponding to a respective one of the one or more two-dimensional images as a non-tunnel point in response to the probability as to whether the respective two-dimensional image is captured within a tunnel along the road segment failing to satisfy the predetermined value.

According to some embodiments, the computer program product further includes program code instructions to identify a first tunnel point following a non-tunnel point in a direction of travel of the trajectory as a tunnel entrance point, where the tunnel entrance point represents the entrance of a tunnel along the road. Embodiments optionally include program code instructions to identify a first non-tunnel point following a tunnel point in the direction of travel of the trajectory as a tunnel exit point, where the tunnel exit point represents an exit of the tunnel along the road segment. Embodiments optionally include program code instructions to update the map database of the road network to include the tunnel entrance point and the tunnel exit point. The program code instructions to update a map database of the road network including the road segment with the along the road segment classified as a tunnel point optionally includes program code instructions to update the map database of the road network with bounds of a tunnel entrance and exit.

Embodiments provided herein include a method including: receiving point cloud data representative of an environment from at least one sensor-equipped vehicle traveling on a trajectory along a road segment; generating, from the point cloud data, one or more two-dimensional images in one or more corresponding planes orthogonal to the trajectory; determining, for the one or more two-dimensional images, a probability as to whether a respective two-dimensional image is captured within a tunnel along the road segment; classifying a point along the road segment at a position corresponding to a respective one of the one or more two-dimensional images as a tunnel point in response to the probability as to whether the respective two-dimensional image is captured within a tunnel along the road segment satisfying a predetermined value; and updating a map database of a road network including the road segment with the point along the road segment classified as a tunnel point.

According to an example embodiment, determining for the one or more two-dimensional images, a probability as to whether the respective two-dimensional image is captured within a tunnel along the road segment includes: processing the respective two-dimensional image as an input to a convolutional neural network; and generating, from the convolutional neural network, the probability as to whether the respective two-dimensional image is captured within a tunnel along the road segment. Methods of some embodiments further include classifying a point along the road segment at a position corresponding to a respective one of the one or more two-dimensional images as a non-tunnel point in response to the probability as to whether the respective two-dimensional image is captured within a tunnel along the road segment failing to satisfy the predetermined value.

According to some embodiments, methods include identifying a first tunnel point following a non-tunnel point in a direction of travel of the trajectory as a tunnel entrance point, where the tunnel entrance point represents the entrance of a tunnel along the road segment. Methods optionally include identifying a first non-tunnel point following a tunnel point in the direction of travel of the trajectory as an exit point, where the tunnel exit point represents an exit of the tunnel along the road segment. Methods optionally include updating the map database of the road network to include the tunnel entrance point and the tunnel exit point.

Embodiments provided herein include an apparatus including: means for receiving point cloud data representative of an environment from at least one sensor-equipped vehicle traveling on a trajectory along a road segment; means for generating, from the point cloud data, one or more two-dimensional images in one or more corresponding planes orthogonal to the trajectory; means for determining, for the one or more two-dimensional images, a probability as to whether a respective two-dimensional image is captured within a tunnel along the road segment; means for classifying a point along the road segment at a position corresponding to a respective one of the one or more two-dimensional images as a tunnel point in response to the probability as to whether the respective two-dimensional image is captured within a tunnel along the road segment satisfying a predetermined value; and means for updating a map database of a road network including the road segment with the point along the road segment classified as a tunnel point.

According to an example embodiment, the means for determining for the one or more two-dimensional images, a probability as to whether the respective two-dimensional image is captured within a tunnel along the road segment includes: means for processing the respective two-dimensional image as an input to a convolutional neural network; and means for generating, from the convolutional neural network, the probability as to whether the respective two-dimensional image is captured within a tunnel along the road segment. The apparatus of some embodiments further includes means for classifying a point along the road segment at a position corresponding to a respective one of the one or more two-dimensional images as a non-tunnel point in response to the probability as to whether the respective two-dimensional image is captured within a tunnel along the road segment failing to satisfy the predetermined value.

According to some embodiments, the apparatus includes means for identifying a first tunnel point following a non-tunnel point in a direction of travel of the trajectory as a tunnel entrance point, where the tunnel entrance point represents the entrance of a tunnel along the road segment. The apparatus of example embodiments optionally includes means for identifying a first non-tunnel point following a tunnel point in the direction of travel of the trajectory as an exit point, where the tunnel exit point represents an exit of the tunnel along the road segment. Example apparatuses optionally include means for updating the map database of the road network to include the tunnel entrance point and the tunnel exit point.

BRIEF DESCRIPTION OF THE DRAWINGS

Figure 1:
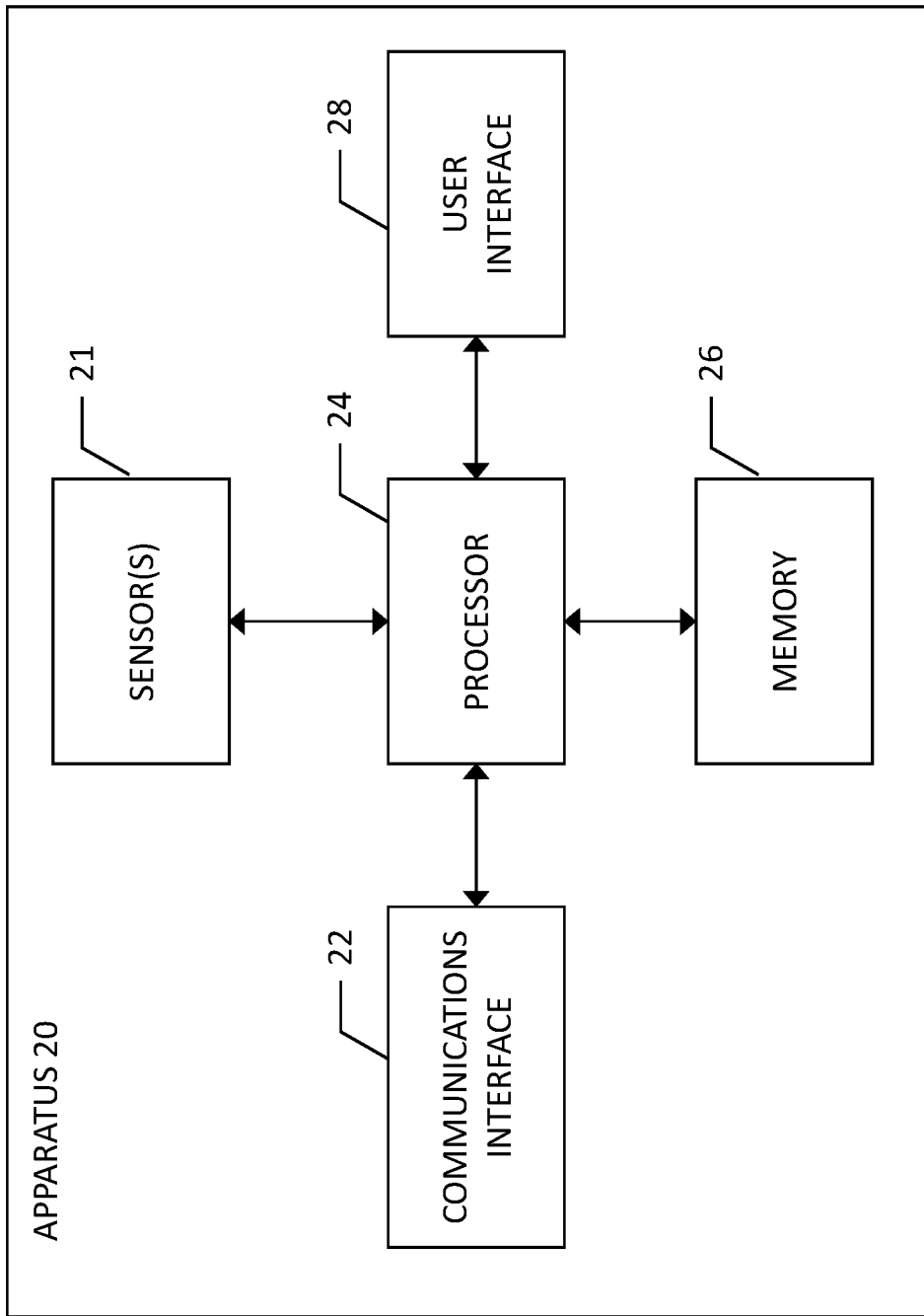
Figure 2:
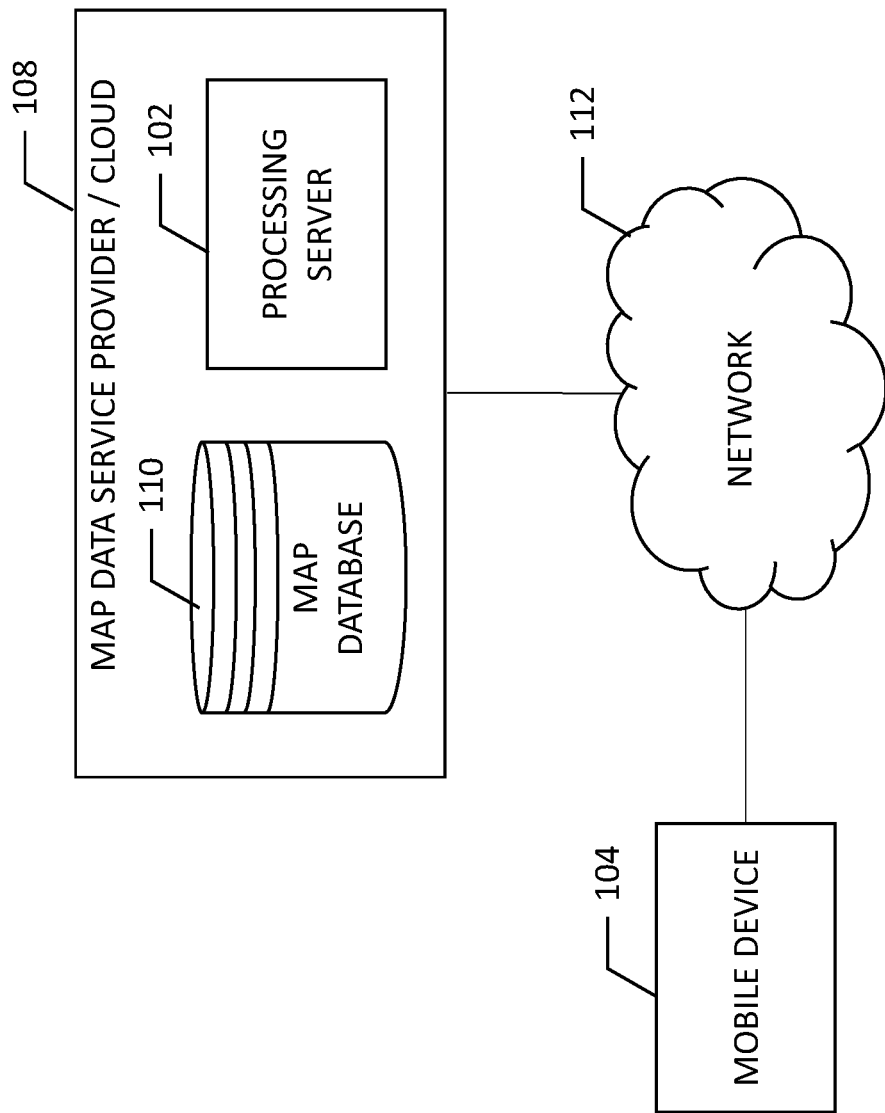
Figure 3:
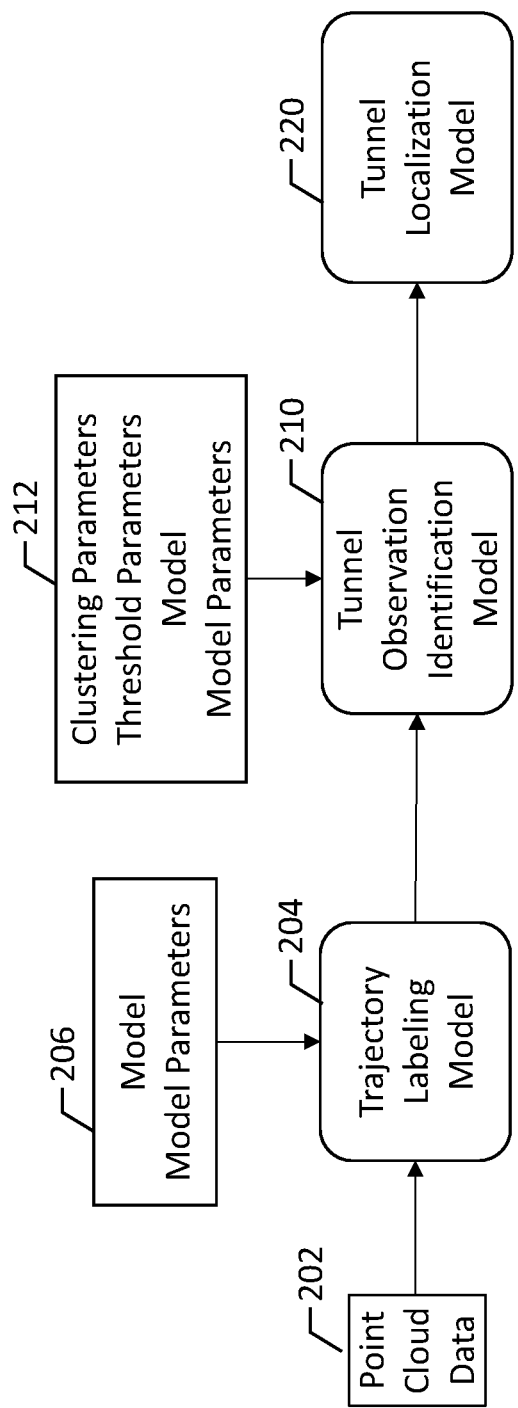
Figure 4:
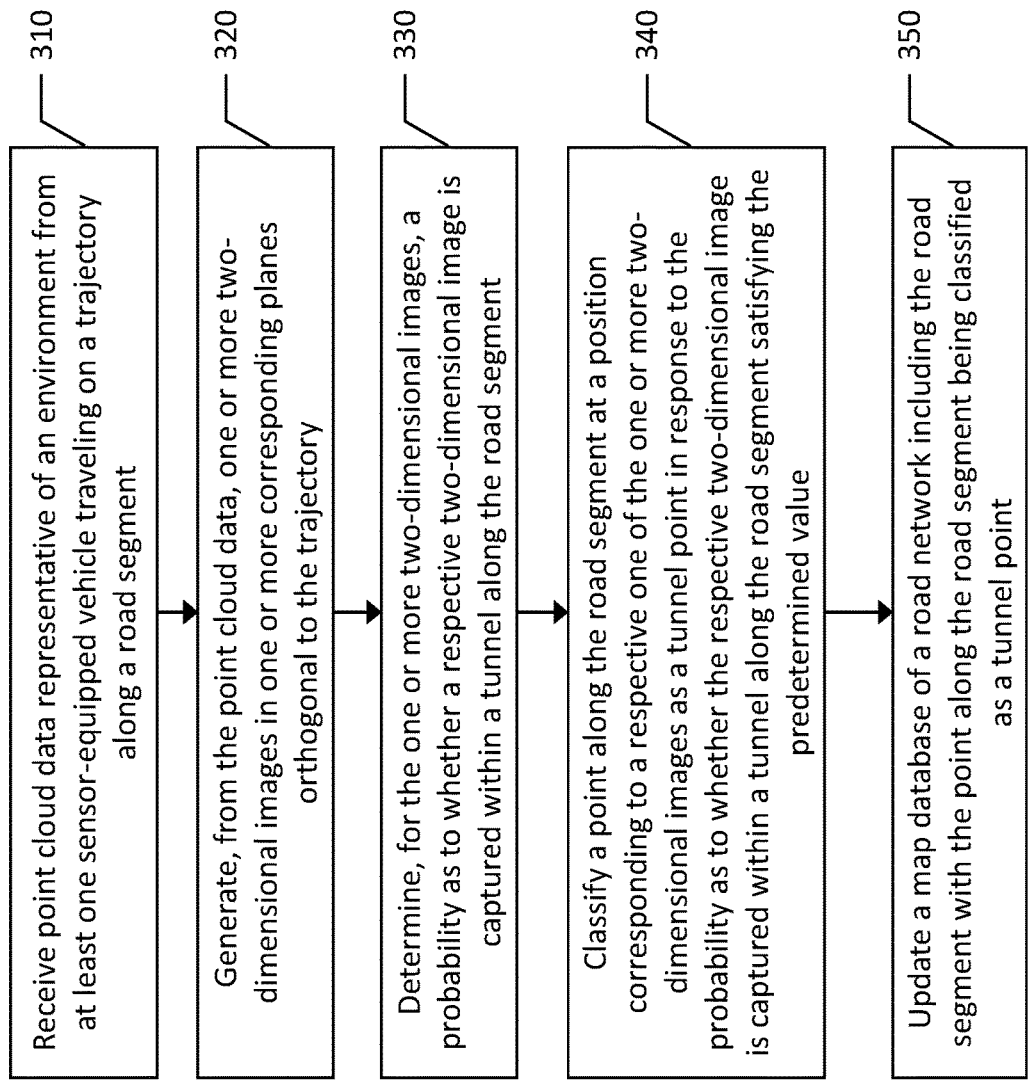

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for using LiDAR data or equivalents thereof to accurately model an environment and to identify tunnels within point clouds according to an example embodiment of the present disclosure;

FIG. 3 is an example embodiment of the process flow for classifying points along a trajectory in an environment as either being in a tunnel or not being in a tunnel according to an example embodiment of the present disclosure; and FIG. 4 is a flowchart of a method for accurately modelling an environment and to identify tunnels within point clouds according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present disclosure for mapping and modeling a three dimensional environment, and more particularly, to using LiDAR data or equivalents thereof to accurately model an environment and to identify tunnels based on sensed point clouds. Embodiments described herein provide a system with techniques to reconstruct a three-dimensional point cloud model to identify and distinguish tunnels along a road segment to facilitate mapping and navigation, along with improved environmental awareness for autonomous or semi-autonomous vehicle control. The three-dimensional point cloud may be generated by, for example, a LIDAR (Light Distancing and Ranging) sensor that collects point information in a three-dimensional environment.

While LIDAR is described herein according to example embodiments for generating a three-dimensional point cloud, a variety of techniques may be used to accomplish a similar three-dimensional point cloud. Light sensing, imagery (e.g., multi-view such as stereoscopic), acoustic sensing, or various other forms of surface detection techniques may be used for generating a three-dimensional point cloud. Thus, while LIDAR is described with regard to example embodiments, various embodiments may use techniques other than LIDAR.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for gathering position/location and environment related information and/or for generating a three-dimensional map and/or model for use in a variety of applications. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), LIDAR sensor (transmitter and receiver), local positioning sensor (e.g., odometer or wheel sensor), or any of a variety of sensors configured to establish location information and environment information around the sensor(s). Any of the sensors may be used to sense information regarding the movement, positioning, or orientation of the device and for determining features of the environment and layout of the surroundings at the location of the device as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret sensed data as surfaces in the surroundings of the sensor and establish location based on other sensor data, such as GPS data, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

According to certain embodiments, the apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

According to example embodiments, map service provider database may be used to provide driver assistance via a navigation system for route guidance, and/or to facilitate some level of autonomous driving (e.g., levels 2-5 of vehicle autonomy as defined by the Society of Automotive Engineers). FIG. 2 illustrates a communication diagram of an example embodiment of a system for implementing example embodiments described herein using a navigation system and a map data service provider. The illustrated embodiment of FIG. 2 includes a mobile device 104, which may be, for example, the apparatus 20 of FIG. 1, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, maneuvering data, and/or data regarding structures. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, parking lots, parking structures (e.g., multi-level parking structures), etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data or location-based hazard warning data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning. However, the most ubiquitous form of data that may be available is vehicle data provided by vehicles, such as mobile device 104, as they travel the roads throughout a region or among a network of roads. These vehicles or probes may be embodied by mobile device 104 and may provide data to the map data service provider in the form of traffic speed/congestion data, weather information, location, speed, direction, tunnel presence information etc.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include a vehicle infotainment system, an in-dash navigation head unit, a personal navigation device, cellular telephone, or an Advanced Driver Assistance System (ADAS) which may facilitate automated driving features such as autonomous driving and/or parking. An end user can use the mobile device 104 for navigation and map functions such as guidance and map display, for example, and for determination of useful driver assistance information, according to some example embodiments.

Example embodiments provided herein provide a method for mapping and modeling a three dimensional environment, and more particularly, to using LiDAR data or equivalents thereof to accurately model an environment and to identify tunnels within point clouds. Autonomous vehicles, in particular, need a resilient and relevant perception of the real-world environment around them to properly function in a dynamic environment. Autonomous vehicles need to understand the presence of objects and their locations to safely navigate as a human driver would. Further, human drivers, even when assisted by technology such as a level of autonomous control, require a detailed understanding of the environment in which they are driving, and can benefit from information regarding upcoming road features, hazards, and restrictions.

The accurate mapping and modeling of tunnels and the inclusion of these tunnels in map data within a map database provides information to vehicles and their drivers that can impact how a vehicle is controlled. For example, understanding the location where a tunnel begins at a tunnel entrance and ends at a tunnel exit can provide a driver with an indication to remove sunglasses, turn on head lights, maintain their lane of travel, and to prepare for potentially narrower road boundaries (e.g., reduce speed, avoid traveling adjacent to a wide load, etc.). Tunnel information can also provide an indication for an autonomous or semi-autonomous vehicle to take actions such as turning on headlights, preparing sensors to adapt to a different light contrast, adjusting speed, adjusting following distance, and other controls that may improve safety. The accurate modeling and mapping of tunnels within a road network therefore benefits all vehicles traveling along the road network.

Embodiments of the present disclosure use three-dimensional point cloud information to generate two-dimensional images or "slices" along a road segment and to determine a probability that individual two-dimensional images are captured within a tunnel. Determining the probability of these two-dimensional images being within a tunnel can provide data points along a trajectory as to where a tunnel begins and ends.

An algorithm of example embodiments receives point cloud data representative of an environment from at least one sensor-equipped vehicle traveling on a trajectory along a road segment of a road network. A trajectory, as described herein, is a path of a vehicle as it travels within a road network. From the point cloud data, two-dimensional images are generated at regularly spaced points along the trajectory by projecting the point cloud points into a two-dimensional plane orthogonal to the trajectory and binning the point cloud points into pixels. These two-dimensional images represent slices of the environment taken along the trajectory at regularly spaced intervals.

The two-dimensional images are each processed to classify the respective images according to whether they are within a tunnel or not. These images may be classified according to a classifier model, which can include a convolutional neural network operating on sequences of the images. The convolutional neural network can be trained from training data that has verified (e.g., human confirmed) tunnels or a lack of tunnels. The convolutional neural network may be augmented using different techniques. These augmentation techniques can include: random translation of two-dimensional image projection points along the trajectory; random small-angle rotation around and from the trajectory path direction; random translation of the two-dimensional images; random small-displacement perturbation of point cloud points (e.g., LiDAR points); and spatial warping either in the point cloud data or in the two-dimensional images. Synthetic point cloud data may also be generated for use in training the convolutional neural network.

Regardless of the process used to determine whether a two-dimensional image is representative of a tunnel or not, the classification of a two-dimensional image as a tunnel is performed using a probability as to whether the image is representative of a tunnel. This probability can be represented as a number between zero and one, with a value of one representing a 100% likelihood that the two-dimensional image is within a tunnel, and a value of zero representing a 0% likelihood that the two-dimensional image is within a tunnel.

Classification of each two-dimensional image from the point cloud data can then be used to generate a probability map, where points along the trajectory corresponding to the respective two-dimensional images are identified with a value representing the probability that the respective point along the trajectory is within a tunnel. This probability map is a one-dimensional map of points along the trajectory classified according to whether respective points are within a tunnel, and may be referred to as a "tunnel likelihood map". Thresholding of the tunnel likelihood map or of individual points along the trajectory can yield which points are established to be within a tunnel. A predetermined value of the probability may be used to define whether a respective point is within a tunnel. This predetermined value may be a threshold probability, where the predetermined value may be established, such as by a machine learning model or based on a learned accuracy of the classification of probability that a two-dimensional image is within a tunnel.

A map database is updated with the tunnel likelihood map to establish where tunnels exist along the road network. A tunnel entrance may be established based on points along the trajectory where there is a transition from a non-tunnel point (classified based on a probability of the respective two-dimensional image at that point corresponding to a tunnel being below the predefined value) to a tunnel point (classified based on a probability of the respective two-dimensional image at that point corresponding to a tunnel satisfying the predetermined value). A similar process can be followed to establish a tunnel exit. This information is used by the map database to define the tunnel entrance and the tunnel exit along the road segment(s) of the road network.

FIG. 3 illustrates a diagram of the disclosed process of using LiDAR data or equivalents thereof to accurately model an environment and to identify tunnels within point clouds. As shown, point cloud data 202 is received at the trajectory labeling model 204 that includes the model and model parameters 206 for establishing how to process the input point cloud data. The trajectory labeling model 204 converts the point cloud data 202 into spaced two-dimensional slices/images in planes orthogonal to the trajectory. The model may be run on each two-dimensional image in order to establish a likelihood or probability that the image is in a tunnel. Once the probability is established for each two-dimensional image, a point corresponding to each two-dimensional image on the trajectory can be output together with the probability.

The points representing the probability of a tunnel existing at the corresponding point along the trajectory can then be used as input to the tunnel observation identification model 210 together with imagery of the environment of the trajectory, which may be maintained, for example, in map database 110. The tunnel observation identification model processes the input according to the clustering parameters, threshold parameters, model parameters, and the model itself as shown at 212. The tunnel observation identification model processes the pixels representing the tunnel probability and employs the predetermined value (e.g., threshold parameters) to determine if a tunnel exists at the position represented by the point. Nearby points along the trajectory are clustered according to whether they represent a tunnel at the respective position or not. Tunnel entrances and exits may be identified from the tunnel observation identification model 210. These entrances/exits may be paired to form a pair of endpoints for a respective tunnel that define the interval of the road segment(s) over which the tunnel exists. These pairs of endpoints may be output to the tunnel localization model 220.

The tunnel localization model 220 uses the pairs of endpoints for each tunnel as input together with top-down point cloud information. The trajectory can be projected onto the top-down point cloud, where bounds of a tunnel are refined, and the output of the tunnel localization model includes a single tunnel with refined bounds that becomes part of the map database for use with navigation and/or autonomous vehicle control.

Embodiments described herein can further be used to create improved three-dimensional mapping contents directly from spatial point clouds such as LiDAR data without losing valuable information that may be lost during conversion between three-dimensional and two-dimensional representations. Accurate and concise maps are necessary for high definition three-dimensional precision maps to ensure proper functionality of some applications in the perspective of scalability. For example, autonomous vehicle control requires an accurate and concise map to safely navigate an environment. Methods described herein use point cloud data to accurately model an environment and to identify where tunnels begin and end. The identification of tunnels along a network of roads better enables improved reconstruction of an environment for better three-dimensional map creation and to use the environment information for autonomous vehicle control.

Navigation of roadways through digital map data can be informed through map data from municipalities, probe data from vehicles traversing the roads, or known vehicles traversing roads to establish the physical location of the roads. This mapping enables relatively accurate mapping of roadways and facilitates navigation and autonomous driving application. However, for increased autonomous vehicle functionality, a higher degree of accuracy and reliability is needed for objects and road or environmental features found along roadways than conventionally provided by map data resources. While such map data resources may provide sufficient detail for certain applications, mapping and autonomous driving may require more detailed and accurate representations of physical structures and environments (e.g., tunnels) through which a vehicle is navigating.

Three-dimensional point cloud reconstruction of a physical structures based on sensor data such as RGB-D or LiDAR sensors may provide raw measurement as described above for segmentation of the point cloud to establish two-dimensional images from which tunnel presence can be more readily identified. Example embodiments described herein provide a system to more readily discern tunnels along road segments and to identify entrances and exits of these tunnels. A system may include a mobile device, such as apparatus 20 of FIG. 1, which may be a sensing vehicle having three-dimensional LiDAR (or the like vision sensors), GPS, and/or INS (inertial navigation sensing) unit. The sensing vehicle may obtain the necessary point cloud data from an environment including sensed objects to generate the two-dimensional images in planes orthogonal to a trajectory of the vehicle as described above. The sensing vehicle may obtain sensor data as the vehicle traverses the environment to provide sensor data output which may be stored in, for example, memory 26. The sensed data may be provided to a server, such as processing server 102 of map data service provider 108 for processing using the models detailed in FIG. 3 above. Optionally, the sensed data may be processed by the sensing device (e.g., an apparatus as in FIG. 1) and determination of the presence of a tunnel may be generated in real-time as the apparatus encounters and passes through a tunnel.

While mapping may be performed on sensed data from a single vehicle or mobile device 104, embodiments may benefit from a plurality of vehicles or mobile devices 104 providing data regarding the same environment in order to minimize any data noise and to improve the accuracy of the identification of tunnel presences along road segments.

The sensor platform may be a vehicle specifically configured for generating the necessary sensed data or may be crowd-sourced from a vehicle that has the same sensing capabilities that has collected data from the environment of a vehicle as it travels along a trajectory through a network or roads. Such a vehicle may include a three-dimensional LiDAR range sensor or image sensors configured to measure the surroundings of the vehicle, and a GPS/INS unit that allows for positioning to provide an augmented reference for the LiDAR point cloud data. The mobile device 104 or sensing vehicle may use GPS/INS for global positioning within a geographic region, while the three-dimensional LiDAR sensor or image sensor may collect the range or environment data surrounding the vehicle, colored by the reflectivity field, and may be synchronized with the GPS/INS data for fused LiDAR odometry.

FIG. 4 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 4 illustrates a method using LiDAR data or equivalents thereof to accurately model an environment and to identify tunnels within point clouds. As shown, point cloud data is received at 310 representative of an environment from at least one sensor-equipped vehicle traveling or having traveled along a road segment of the trajectory. The point cloud data may be in the form of LiDAR data gathered from LiDAR sensors on a vehicle, for example. At 320, one or more two-dimensional images are generated from the point cloud data, where the one or more two-dimensional images are in one or more corresponding planes orthogonal to the trajectory. At 330, a probability is determined for the one or more two-dimensional images as to whether a respective two-dimensional image is captured within a tunnel along the road segment. A point along the road segment at a position corresponding to a respective one of the one or more two-dimensional images is classified as a tunnel point in response to the probability as to whether the respective two-dimensional image is captured within a tunnel along the road segment satisfying the predetermined value at 340. A map database of a road network including the road segment, such as map database 110, is updated at 350 with the point along the road segment being classified as a tunnel point.

In an example embodiment, an apparatus for performing the method of FIG. 6 above may comprise a processor (e.g., the processor 24) configured to perform some or each of the operations (310-350) described above. The processor may, for example, be configured to perform the operations (310-350) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-350 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive point cloud data representative of an environment from at least one sensor-equipped vehicle traveling on a trajectory along a road segment;
   generate, from the point cloud data, one or more two-dimensional images in one or more corresponding planes orthogonal to the trajectory;
   determine, for the one or more two-dimensional images, a probability as to whether a respective two-dimensional image is captured within a tunnel along the road segment;
   classify a point along the road segment at a position corresponding to a respective one of the one or more two-dimensional images in the one or more corresponding planes orthogonal to the trajectory as a tunnel point in response to the probability as to whether the respective two-dimensional image is captured within a tunnel along the road segment satisfying a predetermined value; and
   update a map database of a road network including the road segment with the point along the road segment classified as a tunnel point.

2. The apparatus of claim 1, wherein causing the apparatus to determine for the one or more two-dimensional images, a probability as to whether the respective two-dimensional image is captured within a tunnel along the road segment comprises causing the apparatus to:
   process the respective two-dimensional image as an input to a convolutional neural network; and
   generate, from the convolutional neural network, the probability as to whether the respective two-dimensional image is captured within a tunnel along the road segment.

3. The apparatus of claim 1, wherein the apparatus is further caused to:
   classify a point along the road segment at a position corresponding to a respective one of the one or more two-dimensional images as a non-tunnel point in response to the probability as to whether the respective two-dimensional image is captured within a tunnel along the road segment failing to satisfy the predetermined value.

4. The apparatus of claim 3, wherein the apparatus is further caused to:
   identify a first tunnel point following a non-tunnel point in a direction of travel of the trajectory as a tunnel entrance point, wherein the tunnel entrance point represents the entrance of a tunnel along the road segment.

5. The apparatus of claim 4, wherein the apparatus is further caused to:
   identify a first non-tunnel point following a tunnel point in the direction of travel of the trajectory as a tunnel exit point, where the tunnel exit point represents an exit of the tunnel along the road segment.

6. The apparatus of claim 5, wherein the apparatus is further caused to:
   update the map database of the road network to include the tunnel entrance point and the tunnel exit point.

7. The apparatus of claim 1, wherein causing the apparatus to update a map database of the road network including the road segment with the point along the road segment classified as a tunnel point comprises causing the apparatus to update the map database of the road network with bounds of a tunnel entrance and exit.

8. A computer program product comprising at least one non-transitory computer-readable storage medium having computer-executable program code instructions stored therein, the computer-executable program code instructions comprising program code instructions to:
   receive point cloud data representative of an environment from at least one sensor-equipped vehicle traveling on a trajectory along a road segment;
   generate, from the point cloud data, one or more two-dimensional images in one or more corresponding planes orthogonal to the trajectory;
   determine, for the one or more two-dimensional images, a probability as to whether a respective two-dimensional image is captured within a tunnel along the road segment;
   classify a point along the road segment at a position corresponding to a respective one of the one or more two-dimensional images in the one or more corresponding planes orthogonal to the trajectory as a tunnel point in response to the probability as to whether the respective two-dimensional image is captured within a tunnel along the road segment satisfying a predetermined value; and update a map database of a road network including the road segment with the point along the road segment classified as a tunnel point.

9. The computer program product of claim 8, wherein the program code instructions to determine for the one or more two-dimensional images, a probability as to whether the respective two-dimensional image is captured within a tunnel along the road segment comprise program code instructions to:

process the respective two-dimensional image as an input to a convolutional neural network; and generate, from the convolutional neural network, the probability as to whether the respective two-dimensional image is captured within a tunnel along the road segment.

10. The computer program product of claim 8, further comprising program code instructions to:

classify a point along the road segment at a position corresponding to a respective one of the one or more two-dimensional images as a non-tunnel point in response to the probability as to whether the respective two-dimensional image is captured within a tunnel along the road segment failing to satisfy the predetermined value.

11. The computer program product of claim 10, further comprising program code instructions to:

identify a first tunnel point following a non-tunnel point in a direction of travel of the trajectory as a tunnel entrance point, wherein the tunnel entrance point represents the entrance of a tunnel along the road segment.

12. The computer program product of claim 11, further comprising program code instructions to:

identify a first non-tunnel point following a tunnel point in the direction of travel of the trajectory as a tunnel exit point, where the tunnel exit point represents an exit of the tunnel along the road segment.

13. The computer program product of claim 12, further comprising program code instructions to:

update the map database of the road network to include the tunnel entrance point and the tunnel exit point.

14. The computer program product of claim 8, wherein the program code instructions to update a map database of the road network including the road segment with the point along the road segment classified as a tunnel point comprise program code instructions to update the map database of the road network with bounds of a tunnel entrance and exit.

15. A method comprising:

receiving point cloud data representative of an environment from at least one sensor-equipped vehicle traveling on a trajectory along a road segment;

generating, from the point cloud data, one or more two-dimensional images in one or more corresponding planes orthogonal to the trajectory;

determining, for the one or more two-dimensional images, a probability as to whether a respective two-dimensional image is captured within a tunnel along the road segment;

classifying a point along the road segment at a position corresponding to a respective one of the one or more two-dimensional images in the one or more corresponding planes orthogonal to the trajectory as a tunnel point in response to the probability as to whether the respective two-dimensional image is captured within a tunnel along the road segment satisfying a predetermined value; and updating a map database of a road network including the road segment with the point along the road segment classified as a tunnel point.

16. The method of claim 15, wherein determining for the one or more two-dimensional images, a probability as to whether the respective two-dimensional image is captured within a tunnel along the road segment comprises:

processing the respective two-dimensional image as an input to a convolutional neural network; and generating, from the convolutional neural network, the probability as to whether the respective two-dimensional image is captured within a tunnel along the road segment.

17. The method of claim 15, further comprising:

classifying a point along the road segment at a position corresponding to a respective one of the one or more two-dimensional images as a non-tunnel point in response to the probability as to whether the respective two-dimensional image is captured within a tunnel along the road segment failing to satisfy the predetermined value.

18. The method of claim 17, further comprising:

identifying a first tunnel point following a non-tunnel point in a direction of travel of the trajectory as a tunnel entrance point, wherein the tunnel entrance point represents the entrance of a tunnel along the road segment.

19. The method of claim 18, further comprising:

identifying a first non-tunnel point following a tunnel point in the direction of travel of the trajectory as a tunnel exit point, where the tunnel exit point represents an exit of the tunnel along the road segment.

20. The method of claim 19, further comprising:

updating the map database of the road network to include the tunnel entrance point and the tunnel exit point.

* * * * *